United States Patent
Uyeno et al.

(10) Patent No.: US 12,541,098 B2
(45) Date of Patent: Feb. 3, 2026

(54) AMPLIFIED LASER DEVICE USING A MEMS MMA HAVING TIP, TILT AND PISTON CAPABILITY TO BOTH CORRECT A BEAM PROFILE AND STEER THE AMPLIFIED BEAM

(71) Applicant: Raytheon Company, Arlington, VA (US)

(72) Inventors: Gerald P. Uyeno, Tucson, AZ (US); Sean D. Keller, Tucson, AZ (US); Benn H. Gleason, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 1100 days.

(21) Appl. No.: 17/463,225

(22) Filed: Aug. 31, 2021

(65) Prior Publication Data

US 2023/0069658 A1 Mar. 2, 2023

(51) Int. Cl.
*G02B 26/08* (2006.01)
*G01J 9/00* (2006.01)
(Continued)

(52) U.S. Cl.
CPC ............ *G02B 27/0068* (2013.01); *G01J 9/00* (2013.01); *G02B 5/10* (2013.01); *G02B 19/0019* (2013.01);
(Continued)

(58) Field of Classification Search
CPC .. G02B 27/0068; G02B 5/10; G02B 19/0019; G02B 26/0833; G02B 26/101;
(Continued)

(56) References Cited

U.S. PATENT DOCUMENTS 5,404,375 A 4/1995 Kroeger et al.
5,854,702 A 12/1998 Ishikawa et al.
(Continued)

FOREIGN PATENT DOCUMENTS

| CN | 102226848 A | 10/2011 |
|---|---|---|
| EP | 2333603 A1 | 6/2011 |
| WO | 2014200581 | 12/2014 |

OTHER PUBLICATIONS

"U.S. Appl. No. 17/238,147, Non Final Office Action mailed Mar. 4, 2024", 22 pgs.
(Continued)

*Primary Examiner* — Euncha P Cherry
(74) *Attorney, Agent, or Firm* — Schwegman Lundberg & Woessner, P.A.

(57) ABSTRACT

An amplified laser device is provided with one or more Micro-Electro-Mechanical System (MEMS) Micro-Mirror Arrays (MMAs) having tip, tilt and piston capability positioned on either side of the optical amplifier to correct the profile of the beam to improve the gain performance of the optical amplifier or to compensate for atmospheric distortion while steering the amplified beam over a FOR. The MEMS MMAs may be positioned in front of, behind or on both sides of the amplifier. The MEMS MMAs can be configured to optimize the combined amplifier performance, static and time varying, and compensation for atmospheric distortion together or separately.

16 Claims, 6 Drawing Sheets

(51) Int. Cl.
*G02B 5/10* (2006.01)
*G02B 19/00* (2006.01)
*G02B 26/10* (2006.01)
*G02B 27/00* (2006.01)
*H01S 3/08* (2023.01)
*H01S 3/081* (2006.01)
*H01S 3/083* (2006.01)
*H01S 3/139* (2006.01)

(52) U.S. Cl.
CPC ....... *G02B 26/0833* (2013.01); *G02B 26/101* (2013.01); *H01S 3/08068* (2013.01); *H01S 3/08095* (2013.01); *H01S 3/0813* (2013.01); *H01S 3/083* (2013.01); *H01S 3/139* (2013.01); *G01J 2009/002* (2013.01)

(58) Field of Classification Search
CPC .......... G02B 5/09; G02B 7/185; G02B 26/06; G01J 9/00; G01J 2009/002; H01S 3/08068; H01S 3/08095; H01S 3/0813; H01S 3/083; H01S 3/139; H01S 3/08086; H01S 2301/206; H01S 3/0071; H01S 3/2325
See application file for complete search history.

(56) References Cited

U.S. PATENT DOCUMENTS

| | | |
|---|---|---|
| 6,181,450 B1 | 1/2001 | Dishman et al. |
| 6,271,953 B1 | 8/2001 | Dishman et al. |
| 6,327,063 B1 | 12/2001 | Rockwell |
| 6,567,574 B1 | 5/2003 | Ma et al. |
| 6,792,028 B2 | 9/2004 | Cook et al. |
| 7,304,296 B2 | 12/2007 | Mills et al. |
| 7,593,641 B2 | 9/2009 | Tegge, Jr. |
| 7,626,152 B2 | 12/2009 | King et al. |
| 7,660,235 B2 | 2/2010 | Alicherry et al. |
| 7,969,558 B2 | 6/2011 | Hall |
| 8,301,027 B2 | 10/2012 | Shaw et al. |
| 8,305,578 B1 | 11/2012 | Mudge et al. |
| 8,311,372 B2 | 11/2012 | Anderson et al. |
| 8,368,889 B2 | 2/2013 | Schwiegerling et al. |
| 8,380,025 B2 | 2/2013 | Anderson et al. |
| 8,463,080 B1 | 6/2013 | Anderson et al. |
| 8,767,190 B2 | 7/2014 | Hall |
| 8,823,848 B2 | 9/2014 | Chipman et al. |
| 8,983,293 B2 | 3/2015 | Frankel et al. |
| 9,473,768 B2 | 10/2016 | Uyeno et al. |
| 9,477,135 B1 | 10/2016 | Uyeno et al. |
| 9,632,166 B2 | 4/2017 | Trail et al. |
| 9,857,226 B2 | 1/2018 | LeMaster et al. |
| 9,904,081 B2 | 2/2018 | Uyeno et al. |
| 9,927,515 B2 | 3/2018 | Keller et al. |
| 10,148,056 B2 | 12/2018 | Uyeno et al. |
| 10,209,439 B2 | 2/2019 | Keller et al. |
| 10,243,654 B1 | 3/2019 | Uyeno et al. |
| 10,267,915 B2 | 4/2019 | Uyeno et al. |
| 10,381,701 B2 | 8/2019 | Motoi |
| 10,444,492 B2 | 10/2019 | Hopkins et al. |
| 10,613,324 B2 | 4/2020 | Aoki |
| 10,718,491 B1 | 7/2020 | Raring et al. |
| 10,969,598 B2 | 4/2021 | Fest et al. |
| 10,998,965 B2 | 5/2021 | Tong et al. |
| 11,042,025 B2 | 6/2021 | Uyeno et al. |
| 11,333,879 B2 | 5/2022 | Uyeno et al. |
| 2002/0141689 A1 | 10/2002 | Qian et al. |
| 2002/0196506 A1 | 12/2002 | Graves et al. |
| 2003/0062468 A1 | 4/2003 | Byren et al. |
| 2003/0081321 A1 | 5/2003 | Moon et al. |
| 2003/0132405 A1* | 7/2003 | Some ................. G01N 21/9501 250/559.45 |
| 2003/0185488 A1 | 10/2003 | Blumenthal |
| 2004/0072540 A1 | 4/2004 | Wilson et al. |
| 2004/0081466 A1 | 4/2004 | Walther et al. |
| 2004/0141752 A1 | 7/2004 | Shelton et al. |
| 2004/0258415 A1 | 12/2004 | Boone et al. |
| 2005/0031255 A1 | 2/2005 | Schroeder et al. |
| 2005/0100339 A1 | 5/2005 | Tegge |
| 2005/0122566 A1 | 6/2005 | Cicchiello |
| 2005/0288031 A1 | 12/2005 | Davis et al. |
| 2006/0038103 A1 | 2/2006 | Helmbrecht |
| 2007/0031157 A1 | 2/2007 | Yamada et al. |
| 2007/0036480 A1 | 2/2007 | Wu |
| 2007/0116405 A1 | 5/2007 | Kane et al. |
| 2008/0050064 A1 | 2/2008 | Sakai et al. |
| 2010/0054287 A1 | 3/2010 | Ghauri |
| 2010/0149533 A1 | 6/2010 | Fest |
| 2010/0166430 A1 | 7/2010 | Alten |
| 2012/0002973 A1 | 1/2012 | Bruzzi et al. |
| 2012/0008133 A1 | 1/2012 | Silny et al. |
| 2012/0114337 A1 | 5/2012 | Aoki |
| 2012/0155885 A1 | 6/2012 | Hannah et al. |
| 2012/0168605 A1 | 7/2012 | Milanovic |
| 2013/0271818 A1 | 10/2013 | Bastien et al. |
| 2014/0063299 A1 | 3/2014 | Fest et al. |
| 2015/0099476 A1 | 4/2015 | Beals |
| 2015/0172218 A1 | 6/2015 | Beshai |
| 2015/0311981 A1 | 10/2015 | Inagaki et al. |
| 2015/0378242 A1 | 12/2015 | Auxier et al. |
| 2016/0003677 A1 | 1/2016 | Pezzaniti et al. |
| 2016/0043800 A1 | 2/2016 | Kingsbury et al. |
| 2016/0234703 A1 | 8/2016 | Aldana et al. |
| 2016/0266242 A1 | 9/2016 | Gilliland et al. |
| 2016/0294472 A1 | 10/2016 | Palmer et al. |
| 2017/0293137 A1 | 10/2017 | Zhao et al. |
| 2018/0231715 A1 | 8/2018 | Bishop et al. |
| 2019/0066320 A1 | 2/2019 | Uyeno et al. |
| 2019/0154921 A1 | 5/2019 | Xing et al. |
| 2020/0244359 A1 | 7/2020 | Csonka et al. |
| 2021/0088776 A1 | 3/2021 | Uyeno et al. |
| 2021/0091854 A1 | 3/2021 | Uyeno et al. |
| 2021/0092260 A1 | 3/2021 | Uyeno et al. |
| 2021/0103056 A1 | 4/2021 | Braunreiter et al. |
| 2022/0229160 A1* | 7/2022 | Uyeno .................... G01S 17/10 |
| 2022/0342201 A1 | 10/2022 | Gleason et al. |
| 2022/0350133 A1 | 11/2022 | Gleason et al. |

OTHER PUBLICATIONS

"U.S. Appl. No. 17/238,147, Examiner Interview Summary mailed May 9, 2024", 2 pgs.

"U.S. Appl. No. 17/238,147, Response filed May 23, 2024 to Non Final Office Action mailed Mar. 4, 2024", 10 pgs.

"U.S. Appl. No. 16/871,602, Non Final Office Action mailed Nov. 9, 2020", 18 pgs.

"U.S. Appl. No. 16/871,602, Notice of Allowance mailed Feb. 24, 2021", 5 pgs.

"U.S. Appl. No. 16/871,602, Response filed Feb. 8, 2021 to Non Final Office Action mailed Nov. 9, 2020", 12 pgs.

"U.S. Appl. No. 17/007,917, Non Final Office Action mailed Aug. 3, 2021", 35 pgs.

"U.S. Appl. No. 17/007,917, Response filed Dec. 1, 2021 to Non Final Office Action mailed Aug. 3, 2021", 16 pgs.

"High Contrast IR Wire Grid Polarizers", Edmund Optics, [Online]. Retrieved from the Internet: <URL: https://www.edmundoptics.com/f/high-contrast-ir-wire-grid-polarizers/14797/>, (Accessed Sep. 4, 2021), 1 pg.

"Mid-Wave Infrared (MWIR) and Long-Wave Infrared (LWIF) Waveplates", Edmund Optics, [Online]. Retrieved from the Internet: <URL: https://www.edmundoptics.com/f/mid-wave-infrared-mwir-and-long-wave-infrared-lwir-waveplates/14317/>, (Accessed Sep. 4, 2021), 2 pgs.

"Mirrorcle Technologies MEMS Mirrors—Technical Overview", Mirrorcle Technologies, Inc., (2018), 7 pgs.

Kim, et al., "Demonstration of large-angle nonmechanical laser beam steering based on LC polymer polarization grating", Proc. of SPIE vol. 8052 80520T, (May 13, 2011), 13 pgs.

Ayral, J.-L., "Phase-conjugate Nd:YAG laser with internal acousto-optic beam steering", Optics Letters, vol. 16, No. 16, (Aug. 15, 1991), 1225-1227.

(56) References Cited

OTHER PUBLICATIONS

Chiu, Yi, "Shape-Optimized Electrooptic Beam Scanners: Analysis, Design, and Simulation", Journal of Lightwave Technology, vol. 17, No. 1, (Jan. 1999), 108-114.
Kim, Jihwan, "Wide-angle, nonmechanical beam steering using thin liquid crystal polarization gratings", Proc. of SPIE, vol. 7093, (2008), 12 pgs.
U.S. Appl. No. 17/238,147, filed Apr. 22, 2021, Micro-Electro-Mechanical System (MEMS) Micro-Mirror Array (MMA) Steered High-Power Laser Transmitter.
"MEMS Mirror Array—Beam Steering Mode", [Online]. Retrieved from the Internet: <www.youtube.com/watch?v=wHIUU3kKtzM>, (Aug. 10, 2017), 2 pgs.
Rodriguez, et al., "Beam steering by digital micro-mirror device for multi-beam and single-chip lidar", Proc. SPIE 10757, Optical Data Storage 2018: Industrial Optical Devices and Systems, (Sep. 14, 2018), 7 pgs.
Ryf, et al., "MEMS tip/tilt and piston mirror arrays as diffractive optical elements", Proc. SPIE 5894, Advanced Wavefront Control: Methods, Devices, and Applications III, (Aug. 30, 2005), 12 pgs.
Tsou, et al., "Extended-image spatial tracking technique for deep-space optical downlinks", Proc. SPIE 3762, Adaptive Optics Systems and Technology, (Sep. 27, 1999), 101-109.
Tuantranont, et al., "Optical beam steering using MEMS-controllable microlens array", Sensors and Actuators A: Physical vol. 91, Issue 3, (Jul. 15, 2001), 363-372.
"U.S. Appl. No. 17/238,147, Final Office Action mailed Sep. 10, 2024", 19 pgs.
"U.S. Appl. No. 17/238,147, Non Final Office Action mailed Dec. 3, 2024", 14 pgs.
"U.S. Appl. No. 17/238,147, Response filed Feb. 18, 2025 to Non Final Office Action mailed Dec. 3, 2024", 8 pgs.
"U.S. Appl. No. 17/238,147, Response filed Oct. 25, 2024 to Final Office Action mailed Sep. 10, 2024", 10 pgs.
Sun, et al., English translation of CN 102226848 A, 6 pgs.
"U.S. Appl. No. 17/007,917, Notice of Allowance mailed Jan. 10, 2022", 14 pgs.
"U.S. Appl. No. 17/007,917, Supplemental Notice of Allowability mailed Apr. 19, 2022", 2 pgs.
Norton, Andrew, et al., "High-Power Visible-Laser Effect on a 37-Segment Iris AO Deformable Mirror", Proc. SPIE 7595, MEMS Adaptive Optics IV, 759506, (Feb. 17, 2010), 12 pgs.
Salmon, J.T., et al., "An Adaptive Optics System for Solid-State Laser Systems used in Inertial Confinement Fusion", First Annual International Conference on Solid-State Lasers for Application of Intertial Confinement Fusion, Monterey, California, May 30-Jun. 2, 1995, (Sep. 17, 1995), 13 pgs.
Wang, Jinxue, et al., "Doppler Winds Lidar Technology Development and Demonstration", AIAA-2005-6772, Space 2005, Long Beach, California, Aug. 30-1, 2005, 11 pgs.
Yamamoto, R., et al., "Evolution of a Solid State Laser", Proc. SPIE 6552, Laser Source Technology for Defense and Security III, 655205, (May 10, 2007), 11 pgs.

\* cited by examiner

AMPLIFIED LASER DEVICE USING A MEMS MMA HAVING TIP, TILT AND PISTON CAPABILITY TO BOTH CORRECT A BEAM PROFILE AND STEER THE AMPLIFIED BEAM

BACKGROUND OF THE INVENTION

Field of the Invention

This invention relates to amplified laser devices in which the beam profile is corrected to compensate for atmospheric distortion or to improve the performance of the optical amplifier and the amplified beam is steered over a field-of-regard (FOR).

Description of the Related Art

Amplified laser devices may include an optical source that generates a beam, an optical amplifier to amplify the power of the beam and a beam steerer to steer the amplified beam over the FOR. The steering may be accomplished by pointing the entire laser device in the desired direction (e.g. a gimbaled system), reflecting the amplifier beam off one or more mirrors in the desired direction, refracting the beam through one or more optics in the desired direction or a combination thereof.

To improve amplifier gain performance of the amplifier, the laser device may include a sensor to measure the time varying output of the amplifier and a deformable mirror upstream of the optical amplifier to correct the spatial intensity profile of the input beam. A number of piezo actuators are positioned behind the mirror to deform the surface of the mirror to provide the correction. This deformable mirror has limited resolution, slow response times and requires smooth deformations across the surface, which together limit the mirror's effectiveness. See "Evolution of a Solid State Laser," Yamamoto, R et al, Proceedings of the SPIE, volume 6552, 655205-1 (2007).

To improve beam power on target, the laser device may include a wavefront sensor to measure the time varying atmospheric distortion of the path from the device to the target by sensing light scattered from the target and a deformable mirror to correct the wavefront of the beam to compensate for this distortion. Andrew Norton et. al., "High-power visible-laser effect on a 37-segment Iris AO deformable mirror" Proceedings of the SPIE, volume 7595, 759506-1 (2010) discloses an aluminum-coated Iris AO Micro-Electrical Mechanical System (MEMS) segmented Deformable Mirror (DM) that consists of 37 individual segments arranged in a hexagonal pattern. The actuator platform and the three electrodes beneath it form a parallel plate capacitor. When actuated, the platform is displaced downward a distance that is equal to the square of the applied electric potential. DMs are usually operated at a bias positioned that allows for them to correct for the largest variable phase aberrations.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an amplified laser device with one or more Micro-Electro-Mechanical System (MEMS) Micro-Mirror Arrays (MMAs) having tip, tilt and piston capability positioned on either side of the optical amplifier to both correct the profile of the beam and to steer the beam over a FOR. More specifically, the piston capability may be used to correct the wavefront of the beam to compensate for atmospheric distortion. The piston capability may be used to correct the spatial intensity profile of the beam and tip/tilt capability used to correct the cross-section of the beam to improve amplifier gain performance. Tip/tilt are used to steer the beam while piston may be used to preserve the properties of the beam as it is reflected off of the mirror array. One or more MEMS MMAs can be configured to optimize the combined amplifier performance and compensation for atmospheric distortion together or separately.

In different configurations, the mirrors are configured to tip and tilt (rotation) about the X and Y-axes, respectively, and to piston along the Z-axis (translation orthogonal to the XY plane) to provide three degrees-of-freedom (3DOF). In addition to correcting the beam profile and steering the beam, the 3DOF can be used to shape, focus or add optical power to the amplified beam. In an embodiment, each mirror is supported at three vertices of a triangle, wherein lines defined by three different pairs of vertices provide three axes at 60 degrees to one another in the XY plane. Each mirror pivots about each axis to produce tilt, tip and piston in the XYZ space.

The laser device can be configured for different wavelengths by simply changing the dielectric coatings on the mirrors to reflect at different wavelengths. Neither the material system of the MEMS MMA nor the voltages required to actuate the mirrors are wavelength dependent. The mirrors may have dielectric coatings configured to reflect at different wavelengths. The MMA may be segmented to separate the beam into a plurality of independently steered and profile corrected beams. These beams may have the same or different spectral content.

A single MEMS MMA may be placed in front of the optical amplifier and used to optimize the performance of the optical amplifier without regard for atmospheric distortion or can be paired with a wavefront sensor and used to improve both the performance of the optical amplifier and provide compensation for atmospheric distortion while steering the amplified beam over the FOR. Furthermore, the MEMS MMA may be used to compensate for time varying thermally induced distortion within the amplifier to maintain the output power and beam quality. In an embodiment, a MEMS MMA steers the beam (while correcting the beam profile) around a conic mirror to scan a circular pattern that passes through a ring amplifier.

A single MEMS MMA may be placed behind the optical amplifier and used to compensate for atmospheric distortion without regard to amplifier performance while steering the amplified beam over the FOR.

A pair of MEMS MMA may be positioned in front of and behind the optical amplifier and paired with a wavefront sensor to measure atmospheric distortion. The first MEMS MMA is used to pre-compensate the beam entering the optical amplifier (i.e. piston to correct its spatial intensity profile or tip/tilt to correct its cross-section) to optimize the static or dynamic gain performance of the amplifier. The second MEMS MMA is used to piston the mirrors to correct the wavefront of the amplified beam to compensate for atmospheric distortion and to tip/tilt the mirrors to steer the amplified beam. In an embodiment, the first and second MEMS MMAs are different sections of a common MEMS MMA. The beam is reflected off of a first section of the common MEMS MMA and reflected back-and-forth through the optical amplifier to a second section of the MEMS MMA.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 6 is a schematic diagram of an amplified laser device in which first and second MEMS MMA on a common device are positioned in front of and behind an optical amplifier to independently optimize amplifier performance and optimize compensation for atmospheric distortion while steering the beam over the FOR.

DETAILED DESCRIPTION OF THE INVENTION

The present invention provides an amplified laser device with one or more MEMS MMAs having tip, tilt and piston capability positioned on either side of the optical amplifier to both correct the profile of the beam and to steer the beam over a FOR. The piston capability may be used to correct the wavefront of the beam to compensate for atmospheric distortion. The piston capability may be used to correct the spatial intensity profile of the beam and tip/tilt capability used to correct the cross-section of the beam to improve amplifier gain performance. As used herein, the phrase "correct the beam profile" or similar are used as a generic term that includes correcting the wavefront, spatial intensity profile or cross-section of the beam. One or more MEMS MMAs can be configured to optimize the combined amplifier performance and compensation for atmospheric distortion together or separately. The MEMS MMA has high spatial resolution, fast response times and allows for local discontinuities to correct the beam profile and steer the amplified beam.

Referring now to FIGS. 1, 2A-2B, 3A-3B and 4A-4C, an embodiment of a laser device 100 includes a laser source 102 configured to generate a beam 104 of optical radiation. The source may be configured to emit a single narrowband beam at a specified wavelength, multiple narrowband beams at different wavelengths or a single broadband beam at different wavelengths. The beam 104 is directed via turning mirrors 106 and 108 through an optical amplifier 110 to amplify the intensity of the beam to illuminate a target 112.

Figure 1:
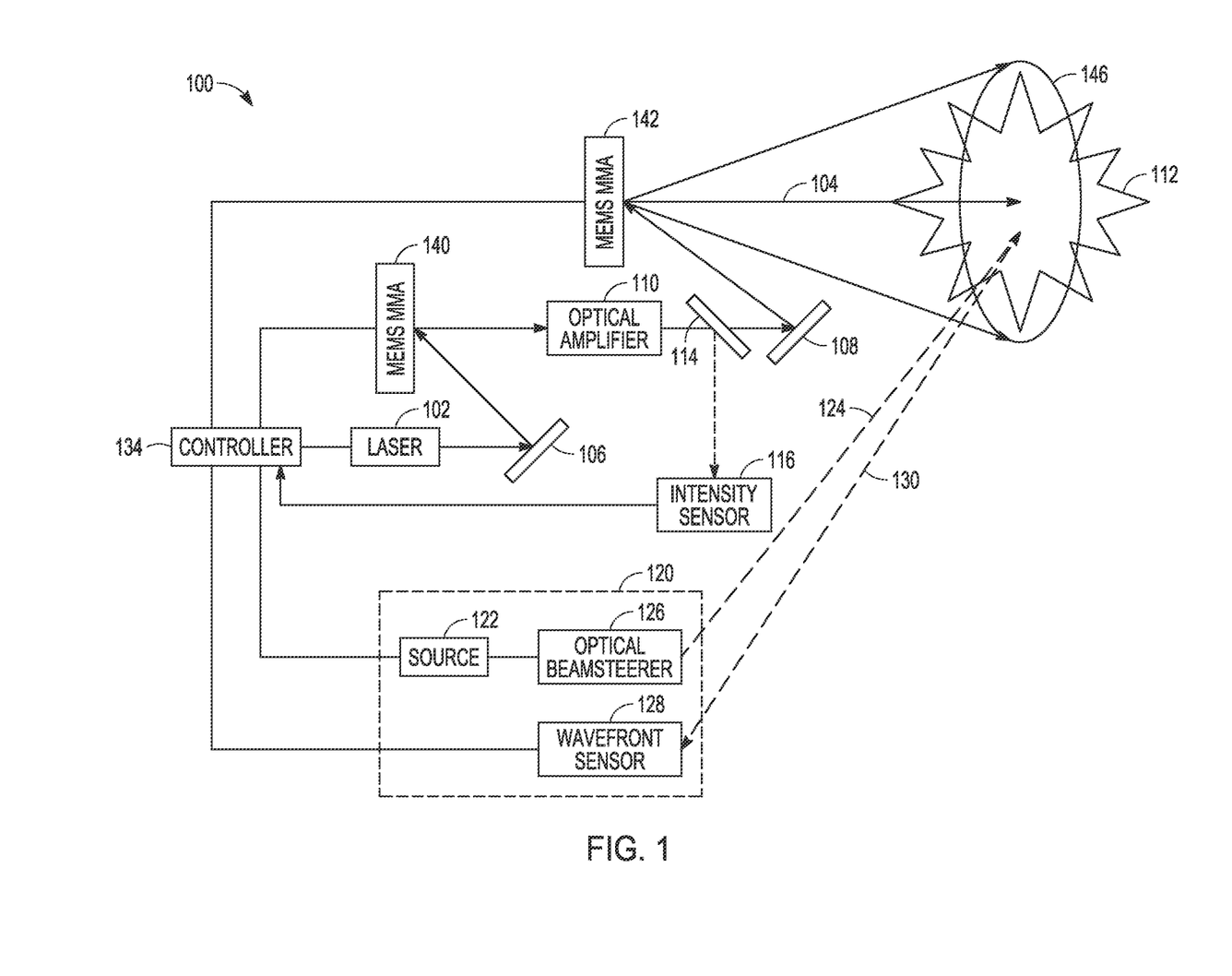
FIG. 1 is a block diagram of an embodiment of an amplified laser device in which one or more MEMS MMAs having Tip/Tilt/Piston capability are used to correct the beam profile to improve amplifier performance or to compensate for atmospheric distortion and to steer the amplified beam.

The optical amplifier 110 includes a pump to pump a gain medium. For optimal performance i.e., maximum gain, the beam 104 must enter the optical amplifier with a certain spatial intensity profile, typically a "flat top" profile, with a certain cross-section e.g., rectangular and diameter to match the amplifier. Furthermore, time varying thermally induced distortions within the amplifier may degrade performance. A pick-off mirror 114 samples a small portion of the output power (e.g., less than 1%) and directs it to an intensity sensor 116 to monitor the amplifier's output power.

Atmospheric distortion will also degrade beam 104 as it travels to illuminate target 112. The effects of atmospheric distortion can be compensated for to a certain extent but are time varying and must be measured. A wavefront sensor system 120 includes a source 122 positioned to emit electromagnetic radiation e.g. a SWIR beam 124. A beam steerer 126 such as a rotating mirror, LCWG or MEMS MMA steers the beam to illuminate target 122. A wavefront sensor 128 measures the wavefront of the reflected optical beam 130. In some embodiments, a common optical source may be used to generate a single optical beam that can be used both to illuminate the target and to measure atmospheric distortion.

One or more MEMS MMAs 140 and 142 having tip, tilt and piston capability may be positioned on either side of the optical amplifier 112 to receive the beam 104. Each MMA includes a plurality of mirrors independently responsive to command signals to tip and tilt about first and second axes, respectively, and piston in translation along a third axis (orthogonal to a plane containing the first and second axes) in three degrees-of-freedom (3DOF) to correct a profile of beam 104. A controller 134 is configured to generate command signals to actuate the mirrors in the one or more MEMS MMAs 140 and 142 to correct the spatial intensity profile or cross-section of beam 104 to improve the gain performance of the optical amplifier or to correct the wavefront of beam 104 to compensate for atmospheric distortion while actuating the mirrors to steer the amplified beam over a FOR 146. More specifically, the mirrors are pistoned to correct the spatial intensity profile and tipped/tilted to correct the cross-section to optimize gain performance of the amplifier. The mirrors are pistoned to correct the wavefront of the beam to optimize atmospheric distortion compensation. Tip/tilt are used to steer the beam while piston may be used to account for path length differences across the MMA to preserve the properties of the beam as it is reflected off of the MMA. In different configurations, a single MEMS MMA may be commanded to balance improvements in both amplifier gain performance and atmospheric distortion compensation or a pair of MEMS MMA may be commanded to individually optimize amplifier gain performance and atmospheric distortion compensation.

Figure 2A:
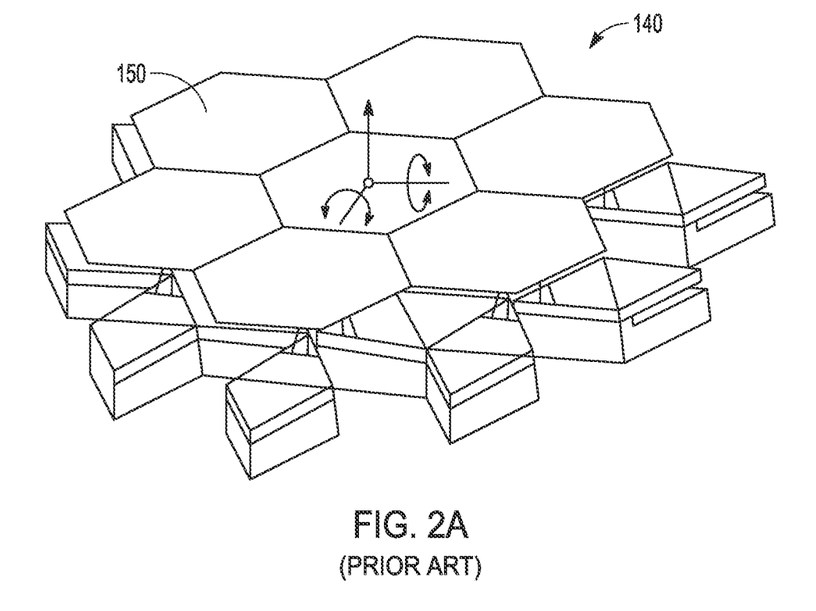
FIGS. 2A-2B are illustrations of a known embodiment of a Tip/Tilt/Piston ("TTP") MEMS MMA and a single mirror actuated to tip, tilt and piston.
Figure 2B:
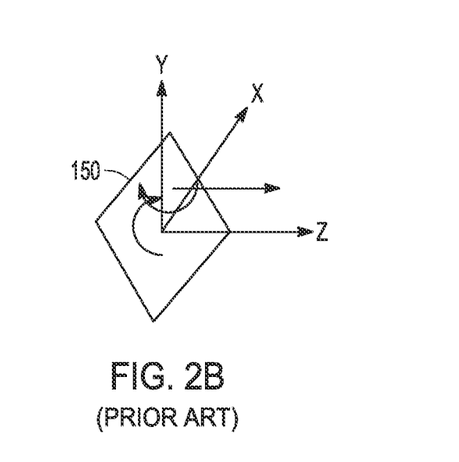

As best shown in FIGS. 2A-2B, an exemplary MEMS MMA 140 comprises a plurality of independently and continuously controllable mirrors 150 to re-direct light in three DOF. Each mirror is capable of at least "Tip" (rotation about an X-axis), "Tilt" (rotation about a Y-axis) and "Piston"

(translation along a Z-axis, perpendicular to the XY plane) where the X, Y and Z are orthogonal axes in a three-dimensional space.

The MEMS MMA is preferably capable of tipping and tilting over range of at least −15°×+15° to steer over a range of +/−30°×30° and pistoning (translating) over a range of at least +/−15 microns (at least one-half wavelength in either direction) piston at a rate of at least 1 KHz (<1 millisecond). Further, the MEMS MMA must have a sufficient number of mirrors, mirror size/resolution, fill factor, range of motion, response time, response accuracy and uniformity across the array.

One such MEMS MMA is described in U.S. Pat. No. 10,444,492 entitled "Flexure-Based, Tip-Tilt-Piston Actuation Micro-Array", which is hereby incorporated by reference. As shown in FIGS. 1-3 of the '492 patent this MEMS MMA uses flexures to support each mirror at three fulcrum points (or vertices) of an equilateral triangle. The three different pairs of fulcrum points define three axes at 60 degrees to one another in the XY plane. Each mirror pivots about each axis to produce tip, tilt and piston in the XYZ space. This MEMS MMA is currently being commercialized by Bright Silicon technologies for "digitally controlling light."

The MEMS MMA may be configured and command to perform multiple optical functions on the beam in addition to correcting the beam profile and steering the amplified beam. The mirrors may also be controlled to focus the beam or otherwise provide additional optical power to the system. As will be illustrated later on, the MEMS MMA may be segmented to split the incoming beam into a plurality of beams, which can be independently steered and corrected. The mirrors may be provided with dielectric coatings to reflect light at a particular wavelength. The mirrors may be provided with dielectric coatings to reflect light at different wavelengths. In combination, the MEMS MMA can generate, correct and steer a beam having different wavelengths (over time) or a diversity of wavelengths (at one time). The MEMS MMA can be commanded to change the number of beams and spectral diversity on the fly and to adapt the correction of the beam profile accordingly.

Figure 3:
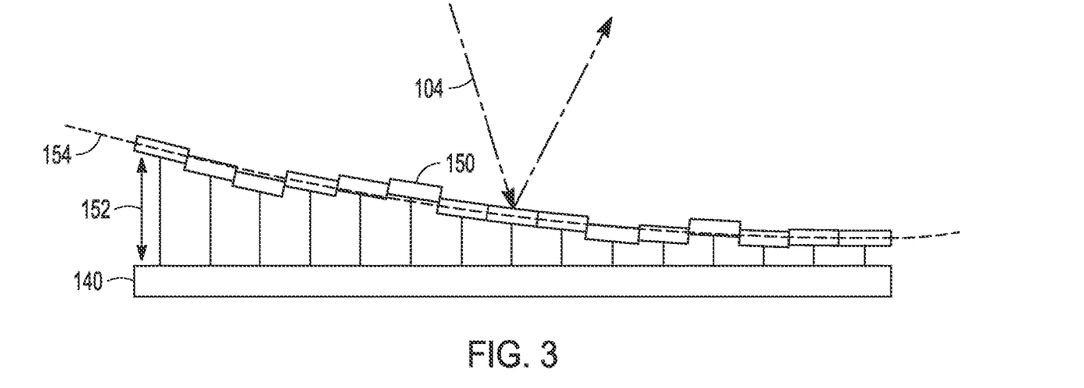
FIG. 3 illustrates mirror Piston to correct the wavefront of the beam and Tip/Tilt to steer the beam.

Referring now to FIG. 3, to correct the wavefront of the beam 104 to compensate for atmospheric distortion, mirrors 150 are translated 152 (pistoned) along the z-axis. The deviations of the positions of the mirrors from a flat or smooth surface inducing corrections to the wavefront of the beam to control phase relationships within the beam. In a real-device, tip/tilt may be useful to provide additional degrees of freedom to control and provide improved piston response. The mirrors are tipped/tilted to steer the beam 104 at a specified angle. As also shown, a curvature 154 is imposed via additional tip/tilt/piston to focus beam 104.

Figure 4A:
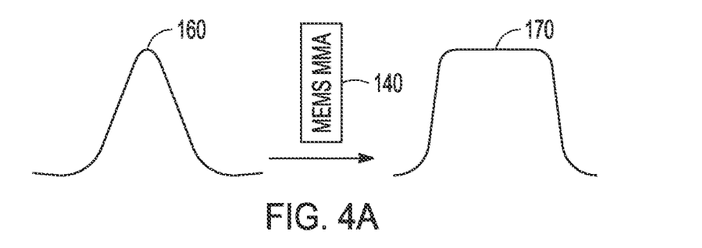
FIGS. 4A-4C illustrate adjustments to the spatial intensity profile to create a flat-top beam and to the cross-section to create a rectangular cross-section having a size matched to the optical amplifier to optimize amplifier performance.
Figure 4B:
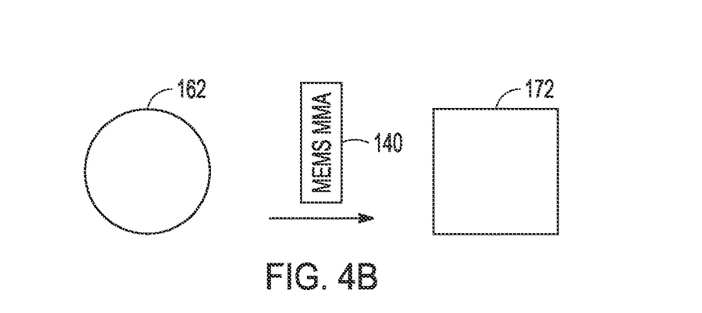
Figure 4C:
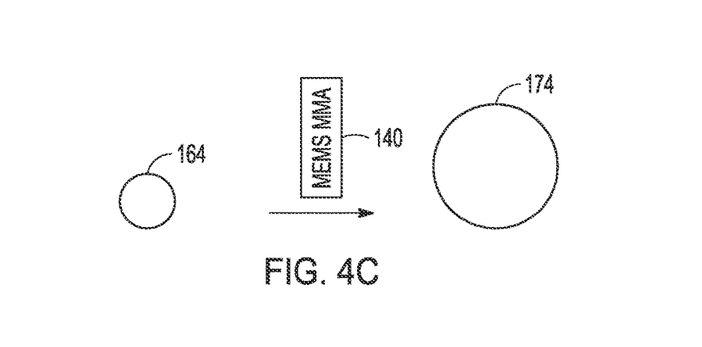

Referring now to FIGS. 4A-4C, a beam generated by the laser will typically have a Gaussian spatial intensity profile 160 with a circular cross-section 162 and a diameter 164. Piston can be used to correct the Gaussian spatial intensity profile 162 to a "flat-top" intensity profile 170 and Tip/Tilt can augment piston to adjust the circular cross-section 162 of the beam to a rectangular cross-section 172 of a certain diameter 174 to maximize amplifier gain for the corrected beam 104. The controller 102 may also monitor the amplifier's output power level to adapt the beam profile to account for the thermally induced distortions in the amplifier to maintain output power and beam quality.

Returning to FIG. 1, the laser device 100 has three basic configurations; a single MEMS MMA 140 in front of optical amplifier 110, a single MEMS MMA 142 behind optical amplifier 110 and the pair of MEMS MMAs 140 and 142 positioned in front of and behind optical amplifier 110. As used herein, "in front of" means before the amplifier towards the laser and "behind" means after the amplifier towards the target. Each configuration has differing requirements and capabilities to correct the beam profile and steer the amplified beam.

In the first configuration, MEMS MMA 140 may be responsive to controller 102 to generate command signals to optimize the gain performance of the optical amplifier (e.g., maximize gain) without regard for atmospheric distortion. In one instance, the controller 102 issues command signals to actuate the mirrors to adjust the spatial intensity profile or cross-section of the beam to improve the gain performance of the optical amplifier. Piston is used to correct the spatial intensity profile and tip/tilt to correct the cross-section shape and size. To a $1^{st}$ order, the controller 102 issues the commands to MEMS MMA 140 to match the optimum spatial intensity profile, cross-section shape and size to the optical amplifier as static parameters. Responsive to intensity sensor 116, the controller 102 may adapt the correction of the beam profile to maintain output power and beam quality.

In a second instance, the controller 102 issues command signals to control the MEMS MMA 140 to account for both amplifier performance and atmospheric distortion. With only a single MEMS MMA the controller 102 must balance improving amplifier gain against compensating for atmospheric distortion to optimize overall performance (e.g. beam power on target). In this instance, controller 102 considers the design and operating parameters of the optical amplifier, possibly the time-vary output power, and the measured atmospheric distortion to determine the appropriate correction of the beam profile.

In the second configuration, MEMS MMA 142 is limited to compensating for atmospheric distortion while steering the amplified beam. The MMA is downstream of the optical amplifier and cannot correct the beam to improve amplifier performance.

In the third configuration, MEMS MMA 140 is used to pre-compensate the beam profile entering the optical amplifier to optimize the gain performance of the amplifier. The second MEMS MMA 142 is used to correct the wavefront of the amplified beam to optimize compensation for atmospheric distortion and to steer the amplified beam. By using a pair of MEMS MMAs to independently optimize amplifier performance and compensate for atmospheric distortion the overall system performance (e.g. beam power on target) is improved.

Figure 5:
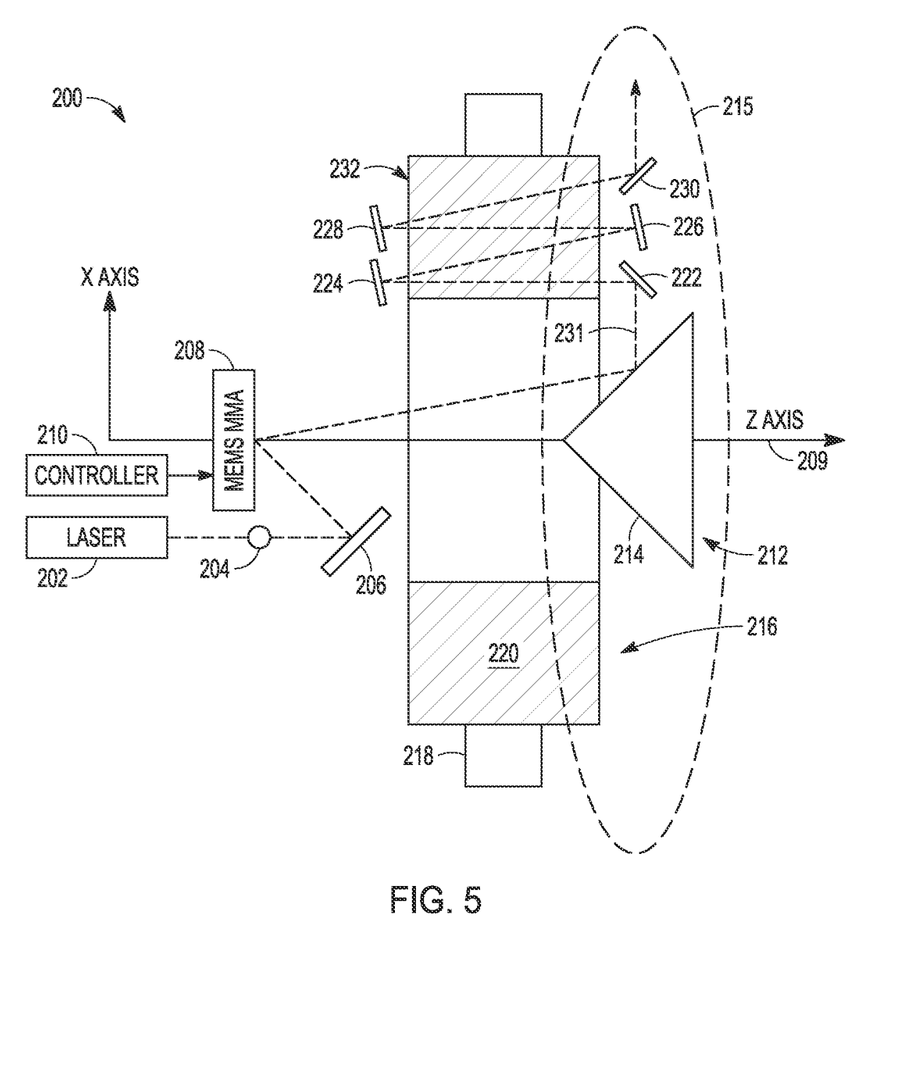
FIG. 5 is a schematic diagram of an amplified laser device in which a single MEMS MMA directs the beam around a conic mirror to scan a circular pattern in which the beam passes through a ring amplifier.

Referring now to FIG. 5, an embodiment of a laser device 200 includes a laser 202 configured to generate a beam 204 at an input wavelength that is reflected off a turning mirror 206 to a MEMS MMA 208. MEMS MMA 208 is responsive to command signals issued by a controller 210 to steer the beam 204 at the input wavelength in two-dimensions (e.g., a circle) about an optical axis 209. A fixed mirror 212 having a conic section 214 oriented along the optical axis 209 is configured to redirect the beam 204 to scan a circular pattern about and away from the optical axis 206 in a two-dimensional FOR 215.

A ring amplifier 216 is positioned in a plane normal to the optical axis 209. The ring amplifier includes one or more pumps 218 configured to pump a gain medium 220 in the form of a ring around the optical axis. In this embodiment, a plurality of mirrors 222, 224, 226, 22 and 230 are positioned fore and aft of the gain medium 220 to redirect the beam 204 traveling along a transmission axis 231 (e.g., the X-axis) to enter and exit sidewall 232 of the gain medium and pass through the gain medium multiple times to amplify the beam 204 and return the amplified beam along transmission axis 230 to scan the circular pattern. The beam 232 preferably enters and, after multiple passes through the gain medium, exits substantially perpendicular to the sidewalls so that the amplifier does not affect the beam shape or beam steering. A focusing element is suitably configured to focus the beam into a spot-beam on the fixed mirror 212. The focusing element may be selected from one of a lens, additional tip, tilt and piston of the mirrors (as in this embodiment), or off-axis sections of a parabolic turning mirror. The MEMS MMA 208 may be controlled to scan the circular pattern continuously around and around, scan a portion of the circular pattern and then jump to another point on the pattern, to hold a specific location in the FOR or to jump around between different locations in the FOR. A more complete description of the ring amplifier for circular scanning is described in U.S. Pat. No. 10,148,056.

In this configuration, as described above, a single MEMS MMA 208 is positioned in front of the ring amplifier 216. The controller superimposes additional wave correction commands on top of the steering commands to improve the amplifier's static or time varying gain, compensate for atmospheric distortion or both. The sensors to monitor the amplifier's output power and atmospheric distortion are omitted from this drawing but would be similar to those shown in FIG. 1.

Figure 6:
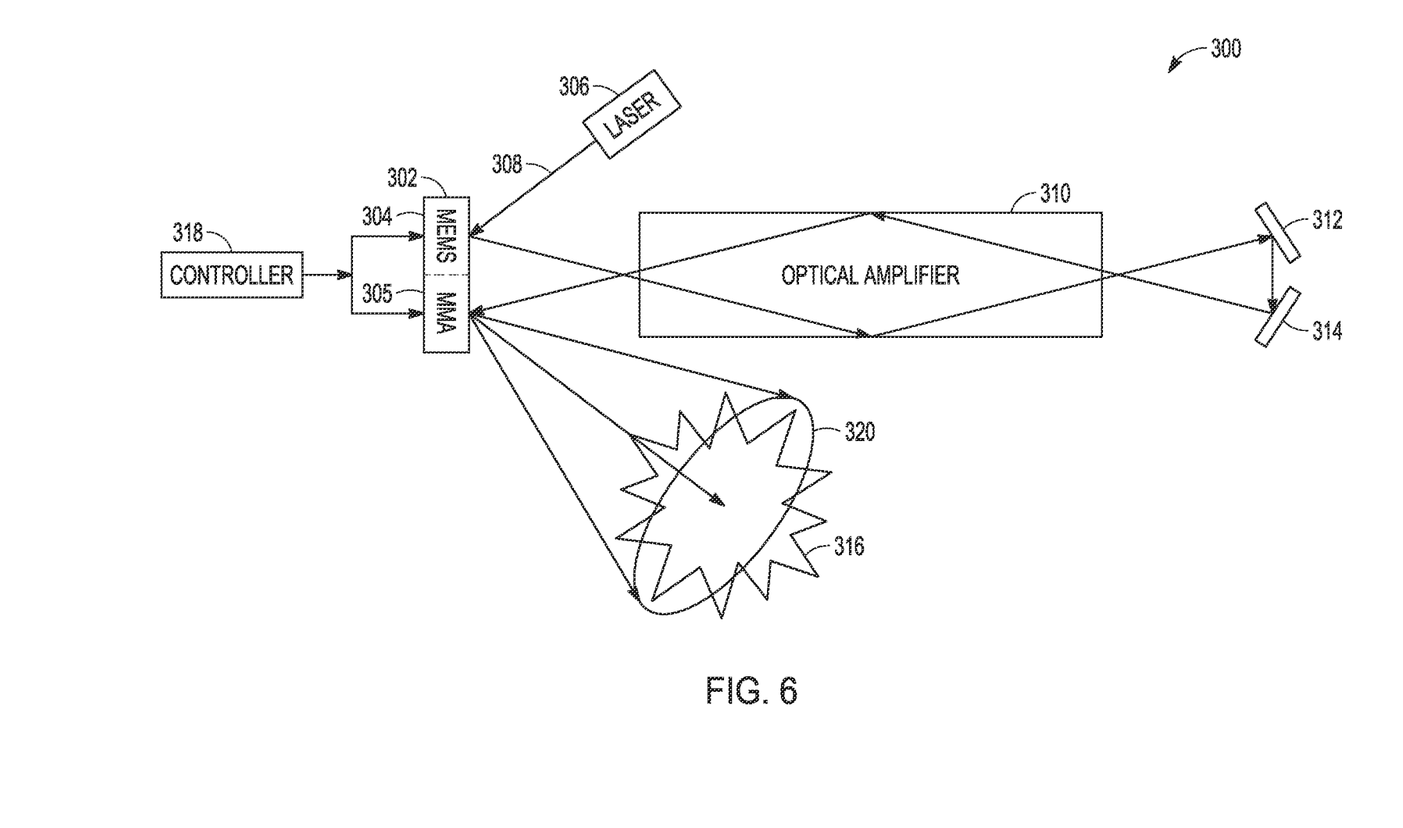

Referring now to FIG. 6, a laser device 300 includes a common MEMS MMA 302 that is segmented into a top section 304 and a bottom section 305. A laser 306 generates a beam 308 that reflects off the mirrors in the top section 304 of MEMS MMA 302 and is coupled into an optical amplifier 310. The beam 308 is amplified as it traverses the length of optical amplifier 310 where it exits the amplifier, is rerouted by turning mirrors 312 and 314 and coupled back into the amplifier. The beam again traverses the length of the amplifier, exits and is reflected off of the mirrors in the bottom section 305 of MEMS MMA 302 and directed towards a target 316.

In this configuration, as described above, with sections of the common MEMS MMA positioned on both sides of the amplifier, the mirrors in top section 304 are commanded by a controller 318 to optimize amplifier performance, static or time varying, and the mirrors in bottom section 305 are commanded to compensate for atmospheric distortion, static or time varying, and to steer beam 308 towards the target within a FOR 320. The sensors to monitor the amplifier's output power and atmospheric distortion are omitted from this drawing but would be similar to those shown in FIG. 1.

Figure 7A:
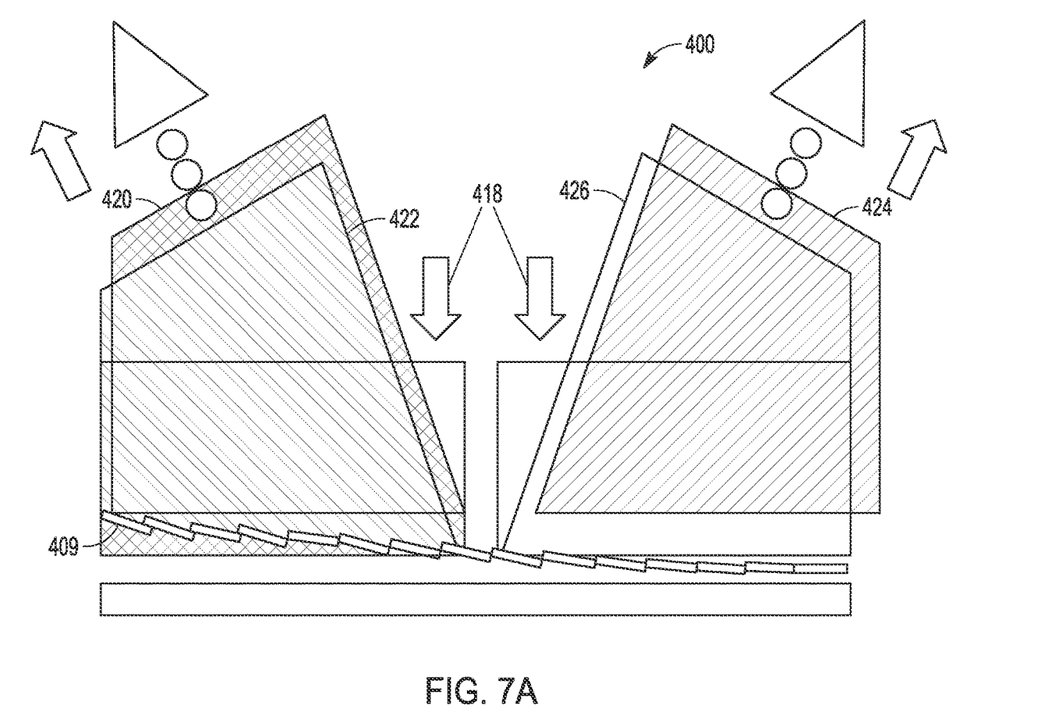
FIGS. 7A-7B are diagrams of an embodiment of a MEMS MMA in which mirrors have dielectric coatings that reflect at different wavelengths and are controlled to independently form, correct and steer multiple beams having a diversity of wavelengths.
Figure 7B:
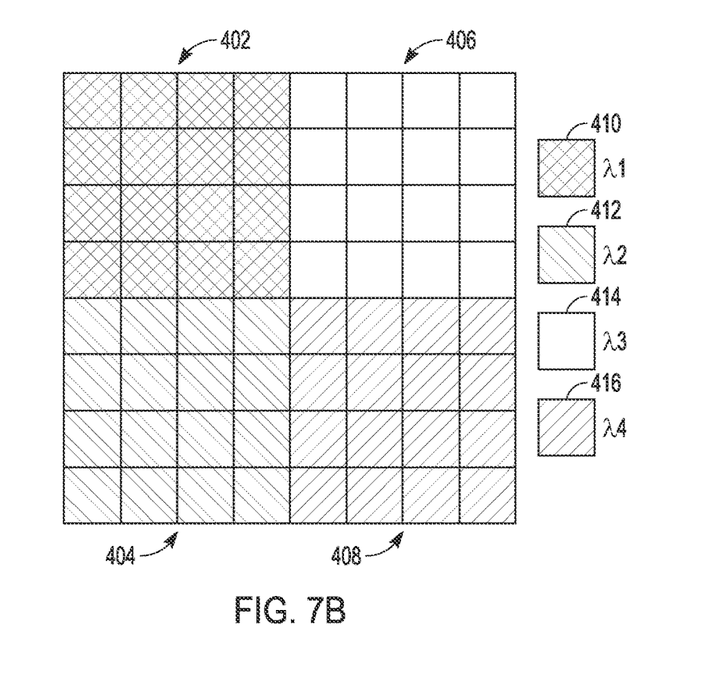

Referring now to FIGS. 7A-7B, as previously mentioned, the MEMS MMA can be configured through dielectric coatings of the mirrors to provide a diversity of wavelengths and command signals to split the incoming beam into a plurality of independently steerable (and correctable) beams. The MEMS MMA can be reconfigured on-the-fly to change the number of beams and the spectral content of those beams. In combination with the capability of the MEMS MMA to simultaneously correct the profiles of those beams to improve amplifier performance, static or time varying, or to compensate for atmospheric distortion, static or time varying, provides an amplified laser device with great flexibility.

Responsive to command signals from the controller, a MEMS MMA 400 is partitioned into four segments 402, 404, 406 and 408 each including a plurality of mirrors 409 illuminated by a beam 418. The mirrors in the different sections are provided with reflective coatings 410, 412, 414 and 416 at different wavelengths. In response to command signals, the MEMS MMA tips/tilts/pistons the mirrors in each segment to independently steer beams 420, 422, 424 and 426 and to correct the beam profiles. Responsive to command signals, the MEMS MMA can change the number of beams as well as the spectral composition of the beams.

The ability to support diverse wavelengths can also be used in a laser device that uses an optical parametric amplifier (OPA). An OPA receives two beams at different wavelengths that interact in the amplifier to create a third beam at a different wavelength from either input beam. In this case, the MEMS MMA can be provided with mirrors having dielectric reflective coatings at the different wavelengths of the pair of input beams. The source could be a single broadband laser spanning both wavelengths or, more typically, a pair of narrowband lasers at the two input wavelengths.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A laser device, comprising:
a laser configured to generate a beam of optical radiation;
an optical amplifier configured to amplify the beam;
one or more Micro-Electro-Mechanical System (MEMS) Micro-Mirror Arrays (MMAs) positioned on either side of the optical amplifier to receive the beam, said one or more MMAs comprising a plurality of mirrors independently responsive to command signals to tip and tilt about first and second axes, respectively, and to piston in translation along a third axis in three degrees-of-freedom (3DOF) to correct a profile of the beam and to steer the beam; and
a controller configured to generate command signals to actuate the mirrors on at least one said MEMS MMA to piston the mirrors to correct the profile of the beam to correct a spatial intensity profile and to tip and tilt the mirrors to correct a cross-section of the beam to improve the gain performance of the optical amplifier to steer the beam over a field-of-regard (FOR).

2. The laser device of claim 1, wherein the mirrors on at least one said MEMS MMA are responsive to command signals to piston the mirrors to compensate for atmospheric distortion and to tip and tilt the mirrors to steer the beam.

3. The laser device of claim 1, wherein the mirrors on at least one said MEMS MMA have dielectric coatings configured to reflect at different wavelengths.

4. The laser device of claim 1, wherein the mirrors on at least one said MEMS MMA are responsive to command signals to separate the beam into a plurality of independently steered and profile corrected beams.

5. The laser device of claim 1, wherein the mirrors on at least one said MEMS MMA are further responsive to command signals to tip and tilt to focus the beam into a spot-beam or to add optical power to the beam.

6. A laser device, comprising:
a laser configured to generate a beam of optical radiation;
an optical amplifier configured to amplify the beam;
a single Micro-Electro-Mechanical System (MEMS) Micro-Mirror Arrays (MMAs) positioned in front of the optical amplifier to receive the beam, said one or more MMAs comprising a plurality of mirrors independently responsive to command signals to tip and tilt about first and second axes, respectively, and to piston in translation along a third axis in three degrees-of-freedom (3DOF) to correct a profile of the beam and to steer the beam; and a controller configured to generate command signals to piston the mirrors to correct the profile of the beam to correct a spatial intensity profile and to tip and tilt the mirrors to correct a cross-section of the beam to optimize the gain performance of the optical amplifier without regard for atmospheric distortion while steering the beam over a field-of-regard (FOR).

7. The laser device of claim 6, further comprising a sensor configured to monitor the output power level of the optical amplifier and feedback the sensed level to the controller, wherein the controller is configured to generate command signals to compensate for time varying fluctuations in the amplifier's output power level.

8. A laser device, comprising:
a laser configured to generate a beam of optical radiation;
an optical amplifier configured to amplify the beam;
a single Micro-Electro-Mechanical System (MEMS) Micro-Mirror Arrays (MMAs) positioned in front of the optical amplifier to receive the beam, said one or more MMAs comprising a plurality of mirrors independently responsive to command signals to tip and tilt about first and second axes, respectively, and to piston in translation along a third axis in three degrees-of-freedom (3DOF) to correct a profile of the beam and to steer the beam;
a wavefront sensor system configured to measure atmospheric distortion,
a controller configured to generate command signals to piston the mirrors to correct a spatial intensity profile and to tip and tilt the mirrors to correct a cross-section of the beam to improve the gain performance of the optical amplifier and to piston the mirrors to correct the wavefront of the beam to compensate for atmospheric distortion while tipping and tilting the mirrors to steer the beam over a field-of-regard (FOR).

9. The laser device of 1, wherein a single said MEMS MMA is positioned in front of the optical amplifier, further comprising:
a fixed mirror having a first conic section oriented along an optical axis that redirects the steered beam away from the optical axis to scan a circular pattern in a two-dimensional FOR; and
wherein the optical amplifier comprises a ring amplifier including one or more pumps configured to pump a gain medium in the form of a ring, said ring amplifier configured such that said beam passes through the gain medium one or more times to amplify the beam while preserving the steering of the beam over the FOR.

10. The laser device of claim 9, further comprising a focusing element configured to focus the beam into a spot-beam on the fixed mirror, said focusing element selected from one of a lens, additional tip, tilt and piston of the mirrors, and off-axis sections of a parabolic mirror.

11. A laser device, comprising:
a laser configured to generate a beam of optical radiation;
an optical amplifier configured to amplify the beam;
a single Micro-Electro-Mechanical System (MEMS) Micro-Mirror Arrays (MMAs) positioned behind the optical amplifier to receive the beam, said one or more MMAs comprising a plurality of mirrors independently responsive to command signals to tip and tilt about first and second axes, respectively, and to piston in translation along a third axis in three degrees-of-freedom (3DOF) to correct a profile of the beam and to steer the beam;
a wavefront sensor system configured to measure atmospheric distortion,
a controller configured to generate command signals to piston the mirrors to optimize compensation for atmospheric distortion without regard for the gain performance of the optical amplifier while tipping and tilting the mirrors to steer the amplified beam over a field-of-regard (FOR).

12. A laser device, comprising:
a laser configured to generate a beam of optical radiation;
an optical amplifier configured to amplify the beam;
first and seconds Micro-Electro-Mechanical System (MEMS) Micro-Mirror Arrays (MMAs) positioned in front of and behind the optical amplifier, respectively, to receive the beam, said one or more MMAs comprising a plurality of mirrors independently responsive to command signals to tip and tilt about first and second axes, respectively, and to piston in translation along a third axis in three degrees-of-freedom (3DOF) to correct a profile of the beam and to steer the beam;
a wavefront sensor system configured to measure atmospheric distortion,
a controller configured to generate command signals for the first MEMS MMA to piston the mirrors to correct a spatial intensity profile and to tip and tilt the mirrors to correct a cross-section of the beam to optimize the gain performance of the optical amplifier and to generate command signals for the second MEMS MMA to piston the mirrors to optimize compensation for atmospheric distortion and to tip and tilt mirrors to steer the beam over a field-of-regard (FOR).

13. The laser device of claim 12, wherein the first and second MEMS MMA are different sections of a common MEMS MMA, wherein the beam reflected off of the first MEMS MMA is reflected back-and-forth through the optical amplifier to the second MEMS MMA.

14. A laser device, comprising:
a laser configured to generate a beam of optical radiation;
an optical amplifier configured to amplify the beam;
one or more Micro-Electro-Mechanical System (MEMS) Micro-Mirror Arrays (MMAs) of which one is positioned in front of the optical amplifier to receive the beam, said one or more MMAs comprising a plurality of mirrors independently responsive to command signals to tip and tilt about first and second axes, respectively, and to piston in translation along a third axis in three degrees-of-freedom (3DOF) to correct a profile of the beam and to steer the beam;
a wavefront sensor system configured to measure atmospheric distortion;
a controller configured to generate command signals to actuate the mirrors to correct the profile of the beam to correct a spatial intensity profile and a cross-section of the beam to improve the gain performance of the optical amplifier and to correct a wavefront of the beam to compensate for atmospheric distortion and command signals to steer the beam over a field-of-regard (FOR)
a sensor configured to monitor the output power level of the optical amplifier and feedback the sensed level to the controller, wherein the controller is configured to generate command signals to compensate for time varying fluctuations in the amplifier's output power level.

15. A laser device, comprising:

a laser configured to generate a beam of optical radiation;

an optical amplifier configured to amplify the beam;

first and second Micro-Electro-Mechanical System (MEMS) Micro-Mirror Arrays (MMAs) positioned in front of and in back of the optical amplifier, respectively, to receive the beam, said one or more MMAs comprising a plurality of mirrors independently responsive to command signals to tip and tilt about first and second axes, respectively, and to piston in translation along a third axis in three degrees-of-freedom (3DOF) to correct a profile of the beam and to steer the beam;

a wavefront sensor system configured to measure atmospheric distortion;

a controller configured to generate command signals for the first MEMS MMA to piston the mirrors to correct a spatial intensity profile and to tip and tilt the mirrors to correct a cross-section of the beam to optimize gain performance of the optical amplifier and to generate command signals for the second MEMS MMA to piston the mirrors to optimize compensation for atmospheric distortion and to tip and tilt mirrors to steer the beam over a field-of-regard (FOR).

16. The laser device of claim 15, wherein the first and second MEMS MMA are different sections of a common MEMS MMA, wherein the beam reflected off of the first MEMS MMA is reflected back-and-forth through the optical amplifier to the second MEMS MMA.

\* \* \* \* \*